(12) United States Patent
Umare et al.

(10) Patent No.: US 9,940,743 B1
(45) Date of Patent: Apr. 10, 2018

(54) OPTIMIZING MAP GENERATION BY REDUCING REDUNDANT TILES

(71) Applicant: Amazon Technologies, Inc., Reno, NV (US)

(72) Inventors: Ketan P. Umare, Kirkland, WA (US); Rajeev Gul Advani, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 535 days.

(21) Appl. No.: 14/231,056

(22) Filed: Mar. 31, 2014

(51) Int. Cl.
*G06T 11/40* (2006.01)
*G01C 21/36* (2006.01)
*G06F 17/30* (2006.01)

(52) U.S. Cl.
CPC ............ *G06T 11/40* (2013.01); *G01C 21/367* (2013.01); *G06F 17/30241* (2013.01)

(58) Field of Classification Search
CPC ........... G06F 17/30241; G06F 17/3028; G06F 17/30244
See application file for complete search history.

(56) References Cited

U.S. PATENT DOCUMENTS

| | | | | |
|---|---|---|---|---|
| 2009/0136142 A1* | 5/2009 | Kosaraju | ............ | G06F 17/3028 382/232 |
| 2010/0321399 A1* | 12/2010 | Ellren | ............... | G06F 17/30241 345/587 |
| 2011/0316854 A1* | 12/2011 | Vandrovec | ............ | G06T 17/005 345/420 |
| 2012/0254804 A1* | 10/2012 | Sheha | .................... | G06Q 30/02 715/834 |
| 2013/0147842 A1* | 6/2013 | Zhu | ........................ | G09G 5/373 345/636 |

* cited by examiner

*Primary Examiner* — Vu Nguyen
(74) *Attorney, Agent, or Firm* — K&L Gates LLP

(57) ABSTRACT

Systems and methods of identifying map tile nodes in a tree data structure are provided. Map tiles are generated, certain ones of which are identified as optimized based on sharing a predetermined attribute that could be redundant with that of other map tiles, eliminating the need to create selected subtrees descending from a parent node. A client device, detecting an error message indicating the absence of a tile in what would be the subtree, can request a parent node of the subtree. Also, a client device, prior to requesting a node below the default level, can consult a matrix that indicates whether the node exists and if not then select a parent node on the default level.

21 Claims, 8 Drawing Sheets

US 9,940,743 B1

OPTIMIZING MAP GENERATION BY REDUCING REDUNDANT TILES

BACKGROUND

In a mapping application, the map of the entire world can be represented as a polygon such as a square or rectangle that can be partitioned into hierarchically organized tiles. Each tile may be associated with information related to cartographic details such as water, land, cities, roads, parks, and so on, that correspond with the features of the portion delimited by such tile.

As is known, nearly three-quarters of Earth's surface is covered by water, with the vast majority of this being contained in large bodies of water covering large continuous regions, such as in the oceans. Thus, a map tile containing an attribute "water only"—i.e., water but no cities, roads, parks, etc. —may, in a mapping database, be functionally repeated identically numbering in the millions.

Initial tile generation from raw map data, thus, may create numerous functionally redundant "water only" tiles. And, the client-server session may implicate many "water only" tiles on the server side, on the client side, and in packets transmitted between server and client. Even certain land tiles can be functionally redundant. For example, the continent *Antarctica* has minimal mapping features.

DETAILED DESCRIPTION

In the following description, reference is made to the accompanying drawings which illustrate several embodiments of the present invention. It is understood that other embodiments may be utilized and mechanical, compositional, structural, electrical and other operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure may overcome one or more deficiencies experienced in conventional approaches to generating and processing map tiles. In particular, various approaches described herein enable identifying and optimizing map tiles to boost speed of initial tile generation and create a lighter, faster client-server interaction. Other benefits include improvements in network data usage (e.g., where a client device downloads many identical, but functionally redundant, tiles that do not convey added information), increased bandwidth for other downloads that may contain more significant information and limit disk storage space, and reduce processing burdens and overhead.

Mapping applications employ various approaches. One approach is to partition map areas into tiles. Each tile can represent a region in the map. Shapes these tiles can take include rectangles and squares, although other shapes are possible. Splitting the map into tiles allows one to download the desired portion(s) of the map efficiently and display only that portion visible on a device(s).

Figure 1A:
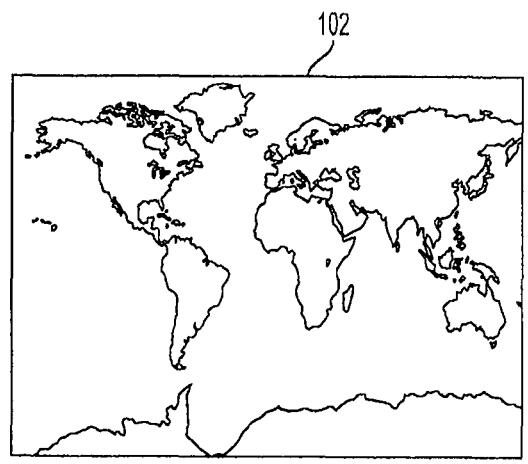
FIGS. 1A, 1B and 1C illustrate an example representation of map tiles which can be characterized by a hierarchy of levels.

FIG. 1A demonstrates how a map can be partitioned in tiles. The entire map of the world can be represented in one top level tile 102. This is obviously seen from a vantage point distant from the surface of the Earth. Understood in such a way, a tile corresponding to this map comprises all oceans, all continents, etc. (It will be noted that this is not exactly to scale; for example; the Pacific Ocean takes up a larger portion than shown.)

Figure 1B:
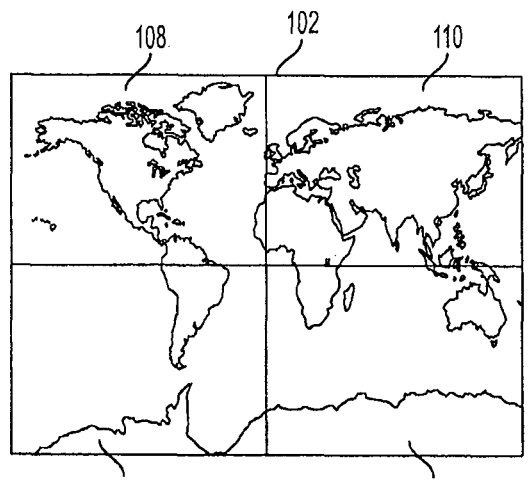

FIG. 1B demonstrates how the top tile can be partitioned into smaller constituent tiles. For example, in an embodiment the top tile can be partitioned into four tiles 104, 106, 108, 110.

Figure 1C:
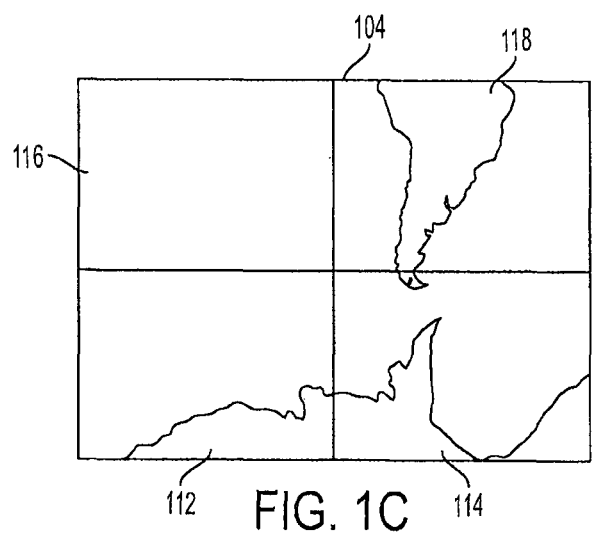

FIG. 1C shows further partitioning, illustrating a "zoom in" on tile 104 (depicted first in FIG. 1B). Tile 104 contains portions of South America, Antarctica, and the Pacific Ocean. As seen in FIG. 1C, tile 104 can be partitioned into smaller constituent tiles 112, 114, 116, 118, each of these can be partitioned into four smaller tiles, and so on.

Top tile 102 can be considered to be located at a first level. The four tiles below the first level, i.e., tiles 104,106, 108 and 110, can be considered to be located at a second level. The 16 tiles immediately below the second level can be considered to be located at a third level.

The top level can, by convention, be considered to represent level 0, the second level can be considered level 1, the third level can be considered level 2, and so on. In an embodiment, there can be 16 levels (enumerated levels 0-15).

Level 0 can be understood to be the most "zoomed out", i.e., farthest from the surface of Earth, and encompassing the entirety of the map. Level 15 can be understood to be the most "zoomed in", i.e., closest to the surface of Earth. Levels that are more "zoomed in" can include more features. In other words, the tiles at zoom levels closer to the surface of Earth can include more detail, such as roads, parks, schools, and other features. Zoom levels farther from the surface provide less detail, and may contain fewer or none of the features contained in the lower zoom levels, even if the same geographic portion is depicted. Levels 1-14 are intermediate zoom levels.

A hierarchy can thus be created from the top tile at level 0, through intermediate tiles—e.g., four each as one gains a level—to level 15 which, closest to the ground, can be represented by approximately 1.073 billion tiles.

In an embodiment, a mechanism for storing, manipulating and processing map data represented in tiles can be accomplished through a tree data structure.

In a tree data structure, data is stored in nodes organized in a hierarchical manner. In an example tree data structure, there is a "parent-child" relationship among a certain set of nodes. The ultimate "parent", which is conventionally rendered at the top of the tree, is specified. This node can correspond to tile 102 representing the entire map region (e.g., the entire Earth). It is known as the root node. A root node can have one or more "child" nodes which represent sub-regions within the root node. Tile 102 can be understood as the parent of tiles 104, 106, 108, and 110, which are its children. A given child node can itself have one or more children, grandchildren, and so on. Thus, each node has one parent, and has one or more children. The exceptions are the root node which by definition has no parent, and a leaf node (or terminal node) which by definition has no child.

Figure 3A:
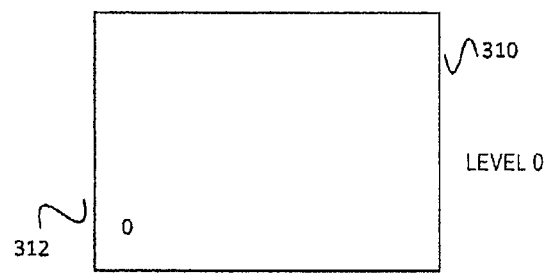
FIGS. 3A-3C illustrate an example representation of quad tree nodes that can be characterized by a hierarchy of levels.
Figure 3B:
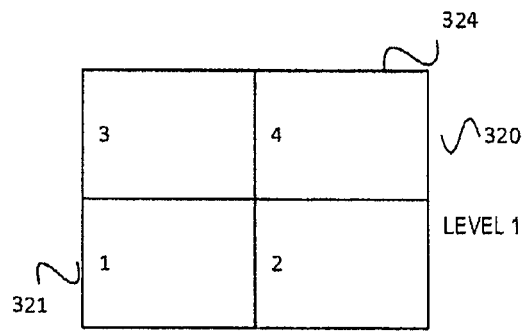
Figure 3C:
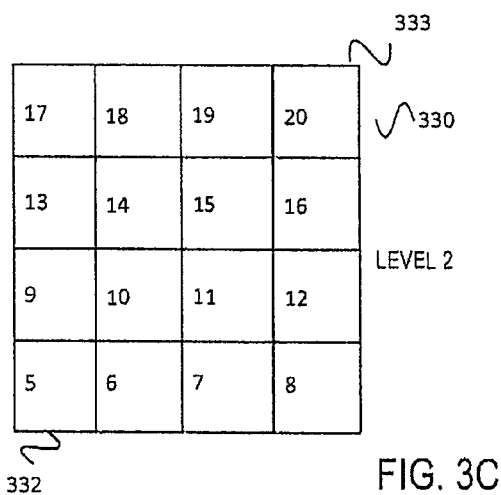

FIGS. 3A-3C show a quad tree comprised of map tiles. Map tiles correspond to nodes. A given level will have 4" nodes, where n=level number. Level 0, which is the first level 310 (shown in FIG. 3A), and is the level farthest from the ground, can be considered the root node. Because it is at level 0, there will be one node 312, because $4°=1$.

At level 1, seen at 320 in FIG. 3B, which is the level immediately below level 0, there will be $4^1=4$ nodes. At level 2, seen at 330 in FIG. 3C, there will be $4^2=16$ nodes. In this way, levels 0-15 can be used to render a map at varying levels of granularity. Generating a quad-tree map of 16 levels (denominated levels 0-15) comprises generating approximately 1.46 billion nodes. Each node can be assigned a number, and multiple numbering schemes can be used, with the numbering scheme in FIGS. 3A-3C being merely one example.

This tree data structure can be used for mapping applications used in various computing devices, such as, for example, a smart phone, tablet computer, or personal computer. In one approach, a selected tile can be represented as a node on the tree. This enables multiple zoom levels.

Figure 2A:
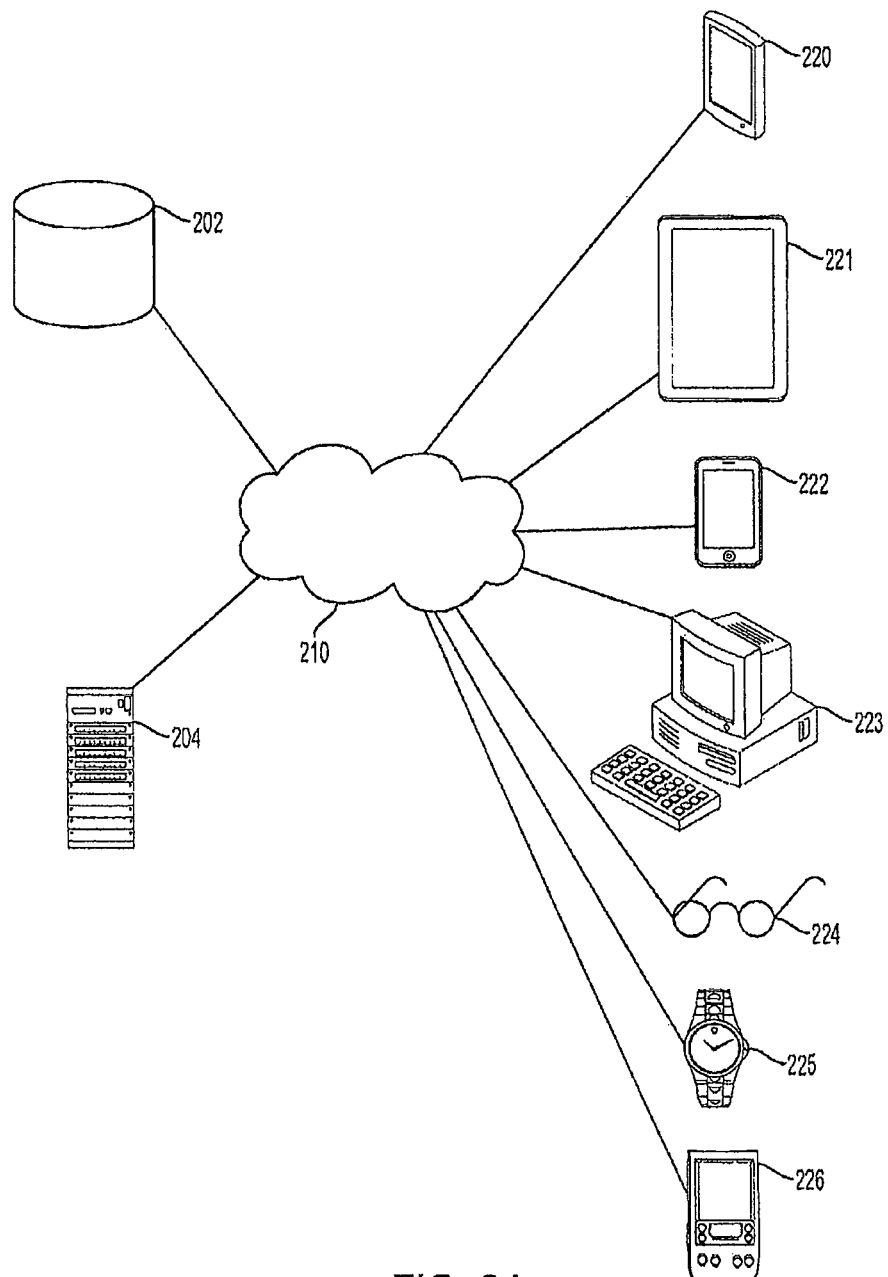
FIG. 2A illustrates an example computing environment in accordance with various embodiments.

FIG. 2 depicts an example computing environment in which various embodiments can be carried out. A storage device (e.g., a database) 202 can be in communication, via a network 210, with a server 204. Database 202 can contain base map data. Server 204 is capable of loading and processing base map data obtained from database 202, and configure such data in information groupings, such as multiple map tiles. A client device in communication with server 204 through a network 210 can request map information. By way of non-limiting example, a client device can be an e-reader 220, a tablet 221, smart phone 222, personal computer, laptop computer or the like 223, smart glasses 224 or similar optical device, smart watch 225, or GPS device 226.

Server 204 may include at least one processor for executing instructions that can be stored in server 204, and may include memory functionality in operative communication with server 204. And, one of skill in the art will also understand that each of client devices 220-226, or another client device, would have at least one processor and at least one memory. Network 210 can include one or all of a wireless or wired network including the Internet, LANs, WANs, and so on, the foregoing in communication with one and another, and it will be readily appreciated that multiple architectures, designs and functionalities of the computing environment can work in accordance with various embodiments herein.

Figure 2B:
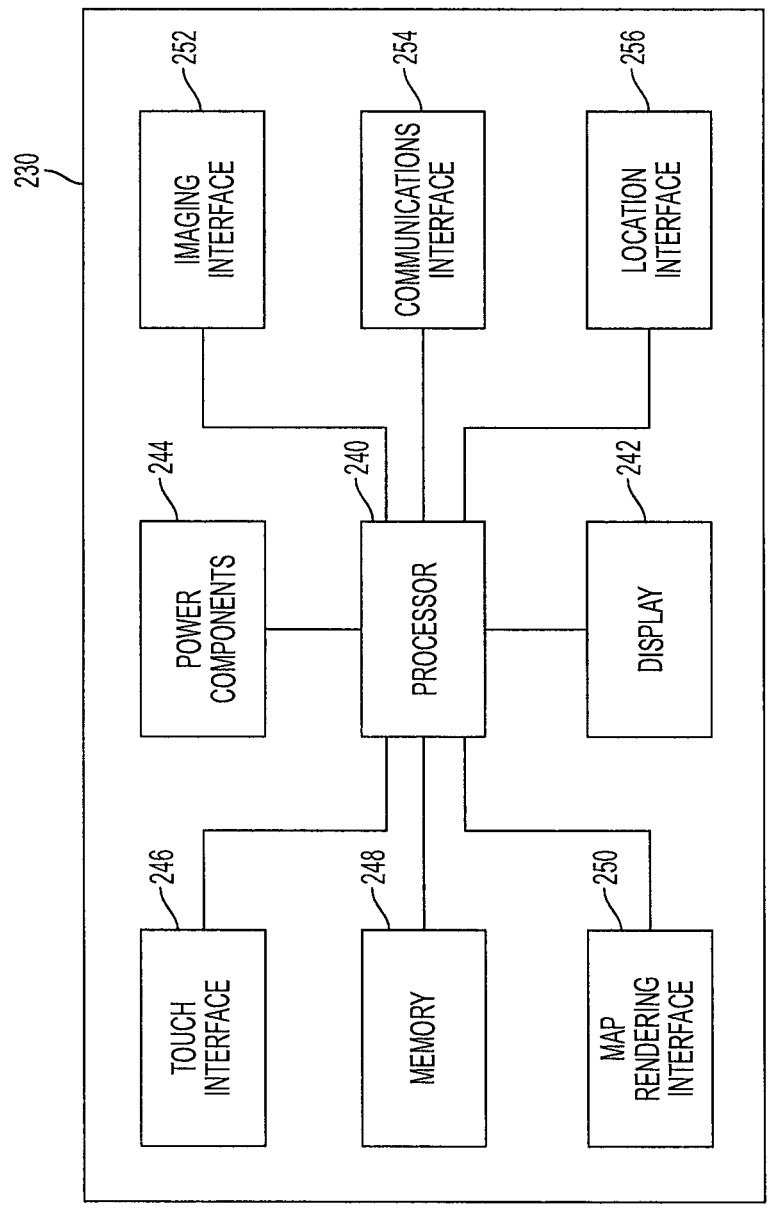
FIG. 2B illustrates components and interface functionality in accordance with various embodiments.

FIG. 2B illustrates an exemplary block diagram of a client computing device 230, in accordance with embodiments of the present invention. The computing device 230 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein. The client device 230 may not necessarily be a mobile or portable device, and thus, in some implementations may comprise a desktop personal computer, a gaming system, a television, other home electronics devices, and other devices providing media presentation functionality.

The client device 230 may include a display component 242. The display component 242 may comprise, for example, one or more devices such as cathode ray tubes (CRTs), liquid crystal display (LCD) screens, gas plasma-based flat panel displays, LCD projectors, or other types of display devices, etc.

The client device 230 may include one or more input devices operable to receive inputs from a user. The input devices can include, for example, a touch interface 246, a push button, wheel, joystick, keyboard, mouse, trackball, keypad, accelerometer, light gun, game controller, or any other such device or element whereby a user can provide inputs to the client device 230. These input devices may be incorporated into the client device 230 or operably coupled to the client device 230 via wired or wireless interface. For computing devices with touch sensitive displays, the input devices can include a touch sensor that operates in conjunction with the display component 242 to permit users to interact with the image displayed by the display component 242 using touch inputs (e.g., with a finger or stylus).

The client device 230 may also include at least one communication interface 254, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the client device 230 may also include one or more wired communications interfaces for coupling and communicating with other devices.

The client device 230 may also include power components 244, such as, for example, a rechargeable battery operable to be recharged through conventional plug-in approaches, or through other approaches such as capacitive charging.

The client device 230 also includes a processing element 240 for executing instructions and retrieving data stored in a storage element, e.g., memory 248. As would be apparent to one of ordinary skill in the art, the storage element can include one or more different types of memory, data storage or computer-readable storage media, such as, for example, a first data storage for program instructions for execution by the processing element 240, a second data storage for images or data and/or a removable storage for transferring data to other devices. The storage element may store software for execution by the processing element 240, such as, for example, operating system software and mapping application.

A map rendering interface 250 can enable efficient rendering of mapping information on the display. An imaging interface 252 can assist with processing mapping information received from an external source such as server 204, or internally stored information. A location interface 256 can process the location information, such as GPS (Global Positioning System) information, of the device 230, and can assist in carrying out mapping functionality.

Thus, although an example computing environment is shown, various other configurations and architectures can be implemented. In addition, a client device capable of determining, processing, and receiving user input can be used in accordance with various embodiments discussed herein. It should be evident that any device with a suitable display or other input/output functionality, such as optical or haptic features that can show mapping information can be used in accord with various embodiments.

The processing burdens during both initial tile generation from raw map data, and during the client-server session, are potentially immense.

Each node contains or may be associated with information related to the geographic region represented by the node. This information may comprise any of a variety of attributes, for example, road information (e.g., roads, transportation links (e.g., shipping routes), paths), physical feature information (e.g., landscape information, such as topographical information, mountains, lakes, rivers, or other land or water boundaries), points of interest (e.g., banks, restaurants, stores), regional boundaries (e.g., city, county, state, country boundaries), and satellite image information. However, as mentioned above, the information associated with certain tiles may contain only water, without other features of interest. In other words, a tile may contain water, but may contain no land, regional boundaries, or other cartographic feature. For example, a tile in the middle of the Pacific Ocean is unlikely to have any cartographic feature except for water. Attributes such as these can have been in the raw map data, and are now associated with a tile or tiles. Attributes, then, can represent numerous characteristics that can be rendered in a mapping application for the benefit of a user. The tiles that contain only the attribute water can represent, in a 16-level quad tree mapping the Earth, more than 1 billion tiles. This means that more than 1 billion tiles are, functionally, identical. Put another way, these tiles are redundant in the sense that an attribute of one tile can convey the attribute of other similar tiles.

Functionally redundant tiles can create challenges, such as, for example, increasing mobile data usage where a client device downloads many identical, but functionally redundant, tiles that do not convey added information. Redundant tiles may also reduce bandwidth available for other downloads that may contain more significant information, unnecessarily consume data storage space, and impose substantial processing loads for the reprocessing of identical information.

In accordance with embodiments of the present invention, the tree data structure can enable functionally redundant tiles to be managed, stored and processed with substantial efficiency. Leveraged by use of the parent-child relationships of the tree, this can produce substantially enhanced performance during both back-end map generation and front-end interactions between client and server.

Before tiles can be used in mapping applications, tiles are initially generated from raw mapping data. Raw map data can contain information on the location of water, land, cities, roads, parks, and other cartographic items of interest. Operations can be performed on raw map data to enable more efficient processing of such items such as where a user requests a map of a desired area. One such operation is converting raw map data into tiles. Tiles can demarcate a geographic region in such a way that hierarchical relationships can be created or better defined, which may be more difficult to accomplish using solely raw map data. Converting to tiles also presents opportunities for efficient processing and transmission of the mapping data. In an embodiment, initial tile generation is performed so as to create quad tree nodes considered to be optimized.

Figure 4:
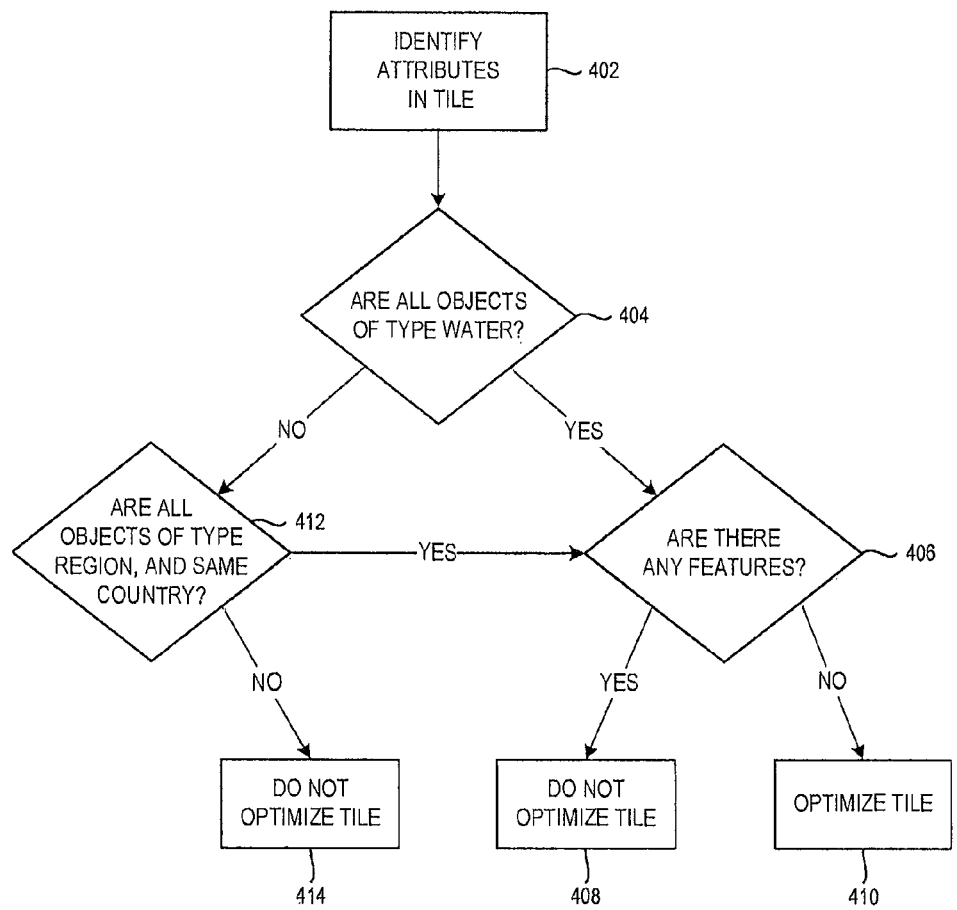
FIG. 4 is an example flowchart related to generating optimized map tiles.

In FIG. 4, when creating a tile, the system can identify natural and human-made attributes that fall within the tile 402, including but not limited to water, region, roads, lakes, rivers, buildings and so on. Such attributes may be associated with details in the raw map data. These attributes can be handled as objects by the system. The system can then determine if all objects in a given tile are of type Water 404. If all objects are of type Water, then the system can ask if there are any added features 406 in the tile such as but not limited to shipping routes, water depth indicators (designated for example by color, lines), and so on. If the system determines there are any features within the tile, such as but not limited to a shipping route or depth indicator, the tile may not be eligible to be considered optimized 408. If, however, the system determines that there are no features in the tile, then this means that all objects in the tile are of type Water.

The tile, in other words, can represent a uniform "blue" characteristic. When this determination is reached, it is understood that this tile can be considered redundant. That is, it is functionally identical to other tiles associated with only the Water attribute. Given that tiles represent portions of the oceans in some maps, such a tile is functionally identical to, and redundant with, millions of other tiles that may be generated in the initial tile generation process. Considerable redundancy also exists with respect to lakes and other large bodies of water.

With this intelligence, the system can optimize tiles. Optimizing tiles can be understood as treating a tile as redundant with another tile. If the attributes of a tile considered to be optimized are known, so are the attributes of other tiles with which it is redundant.

Consider an example where a tile that covers a 20-square-mile area of the Pacific Ocean. This tile may be rendered, by convention, as a simple blue tile with no features. Below this tile, in the hierarchy this tile will have sub-tiles. Each sub-tile will, very likely, represent a blue tile with no features. Below these sub-tiles are other sub-tiles which, very likely, represent blue tiles with no features. In other words, once it is understood that the top tile is blue, all sub-tiles below it can be considered to be blue. It should be emphasized, however, that not all "water only" tiles are, or should be, considered redundant in accord with embodiments disclosed herein. By way of non-limiting example, a water only tile may be part of a river, lake or other body of water within or near a city or other area of detail, it may be a part of an ocean that does not benefit from being optimized, etc.

Translated to the quad tree architecture, if a parent node at a certain level is water only, then it can be considered that all child nodes will be water only. Thus, if a "default level" node has such an attribute, it is very likely that its child nodes do as well.

Various factors can be used in some embodiments to determine which level can be considered the default level, including detail in the map, area of the world in question, processing savings, and more.

In an embodiment, a level at which this assumption can be advanced is level 10. Level 10 represents a node corresponding to about 20 miles. If the system is more "zoomed out"—i.e. towards level 0—then it is more difficult to make such assumption. If the system is more "zoomed in"—i.e., towards level 15—then the potential savings decrease.

If a node is considered to be optimized, then that node and all its children are considered to be optimized. The system can effectively eliminate all nodes in the subtree of the parent optimized node. (As used herein, "parent" in a quad tree can mean a direct parent at the level directly above a child, or any ancestor in a direct ascending path above a specified node toward the root, e.g., the parent, the parent's parent (i.e., grandparent), etc.)

It should be understood that other techniques can be used to signify the "absence of nodes", such as placing a flag in association with a certain node(s) or subtrees, a null attribute can be provided, or the nodes can be generated but designated in such a fashion that they are not effectively able to be located.

Returning to FIG. 4, once it is determined that all objects within a tile to be generated are of type Water, and there are no features, then the system can consider the tile resulting from this operation to be an optimized tile 410. The corresponding node in the quad tree can also be considered optimized. And, its child nodes are considered to be optimized. Indeed, the nodes of the subtree descending from an optimized parent node can be eliminated or otherwise be disregarded. At level 10 of a 15-level quad tree, this can eliminate 1365 nodes.

However, if there are features in the tile 406, then the tile is not eligible to be optimized 408 in accord with embodiments. If this is the case, the system continues with normal generation of the tile, and its children.

However, other instances of redundant nodes can be identified as well. In one example, all of the tiles corresponding to the interior land portions of Antarctica are considered to have a single attribute of "white snow." The system can determine whether all objects are of type Region and belong to the same country 412. If yes, the system can determine if there are any features 406 and if the answer is no, then the tile can be optimized 410. Child tiles of this optimized tile can be considered to comprise "white" tiles. Such tiles can be considered redundant with the parent tile. If step 412 determines that it is not true that all objects are of type Region and same country, then the tile can be regarded as a normal tile and full tile generation can continue 414.

In this manner, the system can determine that subtrees of redundant tiles exist based on attributes of a tile at a default level. Tiles in such subtrees do not need to be generated in the initial tile generation process. If a node in a subtree would be considered redundant on this basis, there is at least one ancestor node in a direct ascending path—i.e., to its parent, to its parent's parent, etc. —that would be considered redundant.

Thus, leveraging the tree structure by identifying redundant water nodes can accomplish substantial savings.

Figure 5:
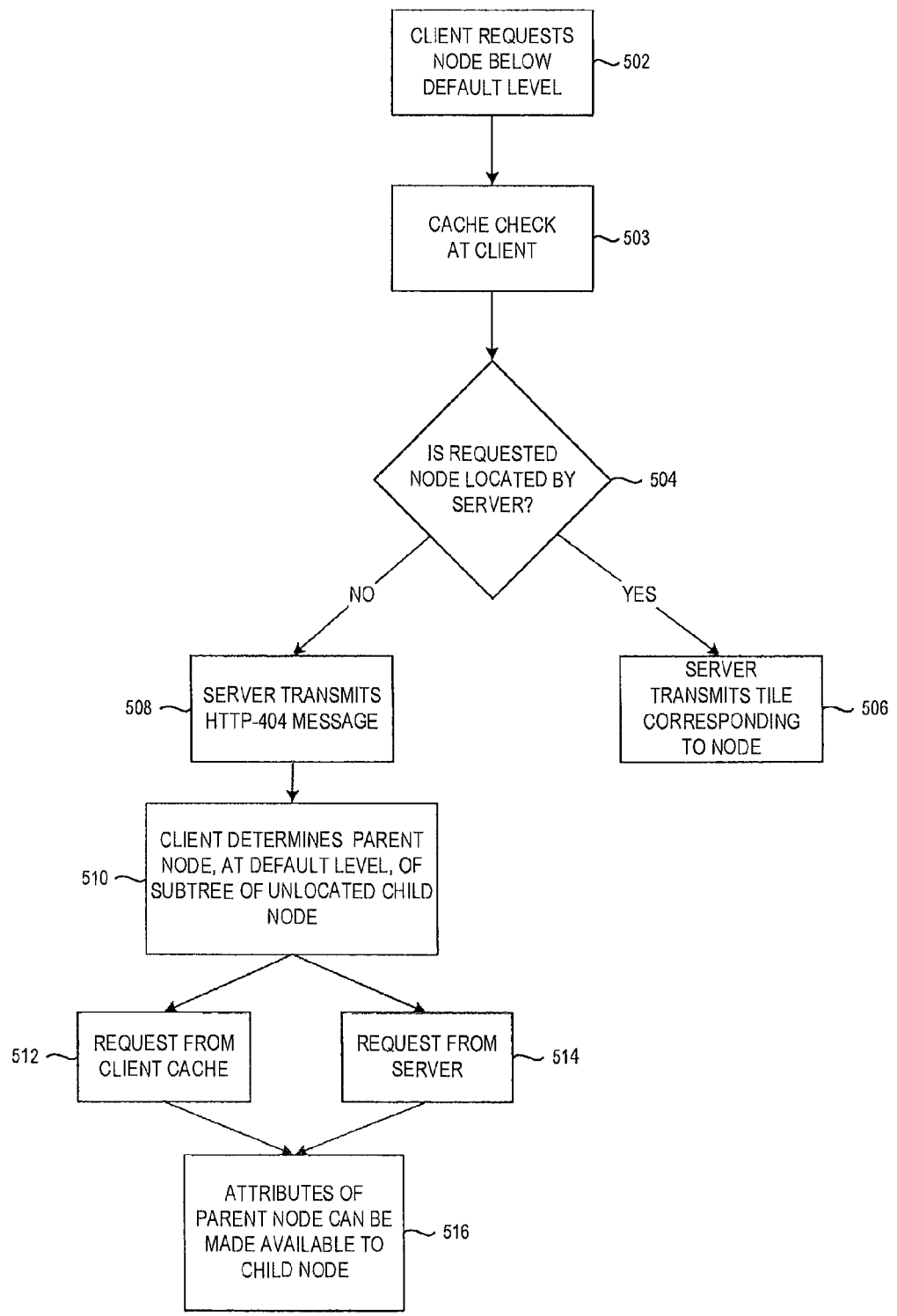
FIG. 5 is an example flowchart related to determining attributes of a child node wherein an error message directs operations to retrieve attributes of a parent node.

FIG. 5 discloses an embodiment that further leverages the quad tree to produce substantial savings and efficiency by use of optimized tiles. In such embodiment, a default level can be chosen. There can be 16 levels, enumerated 0-16, 0 being farthest from Earth, 16 closest. Such default level can be customized to the particular functionality desired. By way of non-limiting example, in an embodiment, level 10 can be selected as the default level. Information regarding the tiles can be stored in a storage device (e.g., database 202) accessible by a server (e.g., server 204), addressable, for example, using a Uniform Resource Identifier (URI), such as a Uniform Resource Locator (URL).

During operation, a client 220-226 can request a tile, such as by requesting a URL, associated with that tile. In an embodiment, if the client requests the URL of a tile located at level 0 to level 10, the information associated with the tile can be returned at the requested level. However, if the client requests a tile from below the predetermined default level, e.g., level 11 to 15—then additional operations can be performed.

A local cache check can be performed at the client 503. This could return the requested information without needing to interrogate server 204. If the requested data is unavailable in cache, server 204 can determine if data corresponding to the requested node is available 504. If the node is available, then the server can transmit the information associated with the tile corresponding to such node 506 to the client.

However, if server 204 determines that the requested node is not available, server 204 can reply with an error message indicating that the requested data is unavailable. When the client is communicating using Hypertext Transfer Protocol (HTTP), the default response code indicating that the client was able to communicate with the server, but the server could not find what was requested is an HTTP-404 message 508, also known as a 404 Not Found message. An HTTP-404 message indicates that the server received the request but has not found anything matching the Request-URI. In accordance with embodiments of the present invention, the client application is configured to interpret this error message (e.g., the HTTP-404 reply) as an indication that the node being requested corresponds to an optimized tile. The client is configured to respond to receipt of the error message 508 by then requesting the parent node, at a default level, of the subtree of the originally requested node 510. The client then treats the information received regarding the parent node at the default level as representative of the information corresponding to the originally requested node. In addition to interrogating a server, the request for map information could be directed to a remote device. The remote device can check if such device—itself or in operative communication with another device—has the information in data storage, and if the remote device lacks such information then it can transmit a message indicating such. Further, as mentioned above, the request for map information by the client device can be made to local memory at or accessible to the client device, and relevant data storage will be checked accordingly.

For example, assume that the client requests a tile at level 13. If the tile is located 504, then the server transmits that level-13 tile. If the tile is not located, then the server transmits a 404 Not Found message 508. Then, the client requests the level-10 parent node of the subtree of the unlocated child node at level 13.

Such request can be made to the client cache 512, to determine if the default-level node is available in association with the client cache. Optionally, such request can be made to the server 514. It will be understood that storage sources can be checked for node information serially, in parallel, or based on another procedure. For example, a cache request 512 can be made, and then if the response is negative—i.e., the requested data is unavailable locally—then a request can be made to the server.

Once the level-10 parent node has been located, its attributes can be made available to, ascribed to or otherwise made inheritable to unlocated level-13 child node 516. For example, if the level-10 parent node is a water node, then the level-13 child node can be given the attributes of the parent node, i.e., water. Or, if the parent node is an Antarctica tile, then the optimized child node can take on relevant attributes and be designated an Antarctica tile as well. In other words, the attributes of a parent node at a default level can be representative of those of its child nodes, where the child nodes have been optimized. Put another way, the subtree of an optimized node can also be considered to be optimized.

Whether or not to carry through all, some or none of a parent node's attribute(s) to a child node can be performed depending on the functionality desired.

The system may need to perform resizing operations to designate and adjust the child node's and parent node's positions. This can be done by reencoding the child tile so that it looks correct on the screen. Reencoding can be accomplished in multiple ways. By way of non-limiting example, reencoding can encompass assigning the label of a parent tile to an optimized child tile. In other words, if an optimized parent node covering tile 116 in FIG. 1C has the label Southern Pacific Ocean associated with it, then optimized children of tile 116 can also be associated with the label Southern Pacific Ocean. Thus, cartographic information associated with a parent, such as but not limited to textual information like a label, can be made available to a child. For example, assume that a child tile represents geography corresponding with the bottom right quarter portion of a parent tile. If the child tile is considered optimized, then the cartography information of the parent tile can be made available in the rendering of the child tile. In addition, relative positioning can be maintained. In other words, cartography information that may be positioned with respect to the upper left portion of the parent child can also be similarly positioned with respect to the upper left portion of the child tile, once mapping information corresponding to the geographic area of the child tile is rendered. In addition, reencoding can also encompass adjusting boundaries of tiles, for example their x-y coordinates. In other words, optimizing child tiles can lead to adjusting their relative positioning and boundaries; as a result, relative positioning and boundaries of neighboring tiles may need to be adjusted as well. Reencoding functionality can be employed with zooming, panning or other user operations, or independent of user input.

Figure 6:
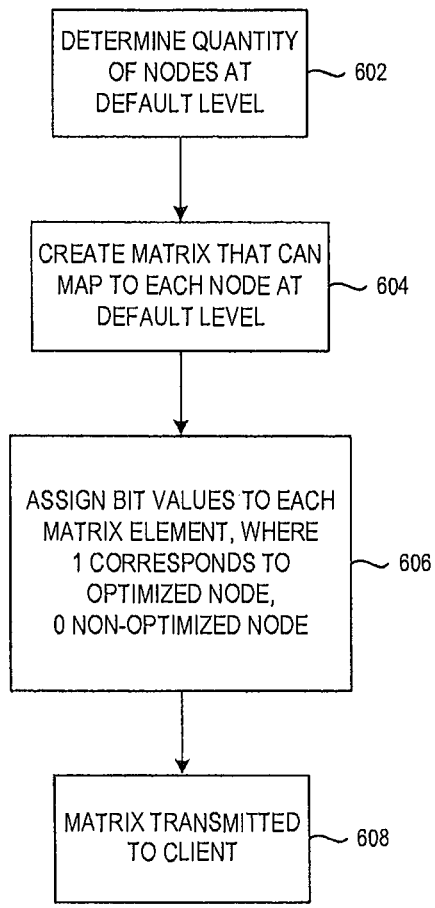
FIG. 6 illustrates an example flowchart related to generating a matrix to encode bit values indicating whether or not a node of a quad tree is optimized.

Further savings and efficiencies can be accomplished. FIG. 6 depicts a method to generate a matrix in accord with an additional embodiment. A quantity of nodes at a default level can be determined 602. A matrix can be created that can map to each node on the default level 604. A logical value to each element of the matrix can be assigned 606; for example, the value 1 can be assigned to an element that corresponds to an optimized node, and the value 0 can be assigned to an element that corresponds to a non-optimized node. The matrix can then be transmitted to a client. It will be understood that one or more matrices, strings or other data structures can be employed in conjunction with such matrix in order to map to the desired node on the default level.

By way of non-limiting example, if the default level is given as level n, for a 15-level quad tree, there are $4^n$ nodes on level n. If the default level is 10, there are $4^{10}$ nodes=1,048,576 nodes on that level. These nodes can correspond to elements in a grid of $\sqrt{4^n}$ rows by $\sqrt{4^n}$ columns, here 1,024 rows by 1,024 columns for level 10. To identify a specific element in this 1,024×1,024 grid, a specific row and column can be designated. In one embodiment, a 32×32 matrix of 32-bit integers is created, with each bit corresponding to one node on the default level 10. In step 606, each bit in this matrix is assigned a bit value of 1 or 0 with a bit value of 1 assigned if the corresponding node is optimized, 0 if it is non-optimized. Then, the matrix can be transmitted to the client 608. The matrix can also be expressed as a data structure with 128 bytes per column and 128 bytes per row. More broadly, the data structure storing logical values such as 1 or 0 may be expressed as a two-dimensional matrix, a three-dimensional or other matrix, a linked-list, or other data structure, so long as the data structure can, alone or in combination with another data structure, map to each node on the default level 604.

Figure 7:
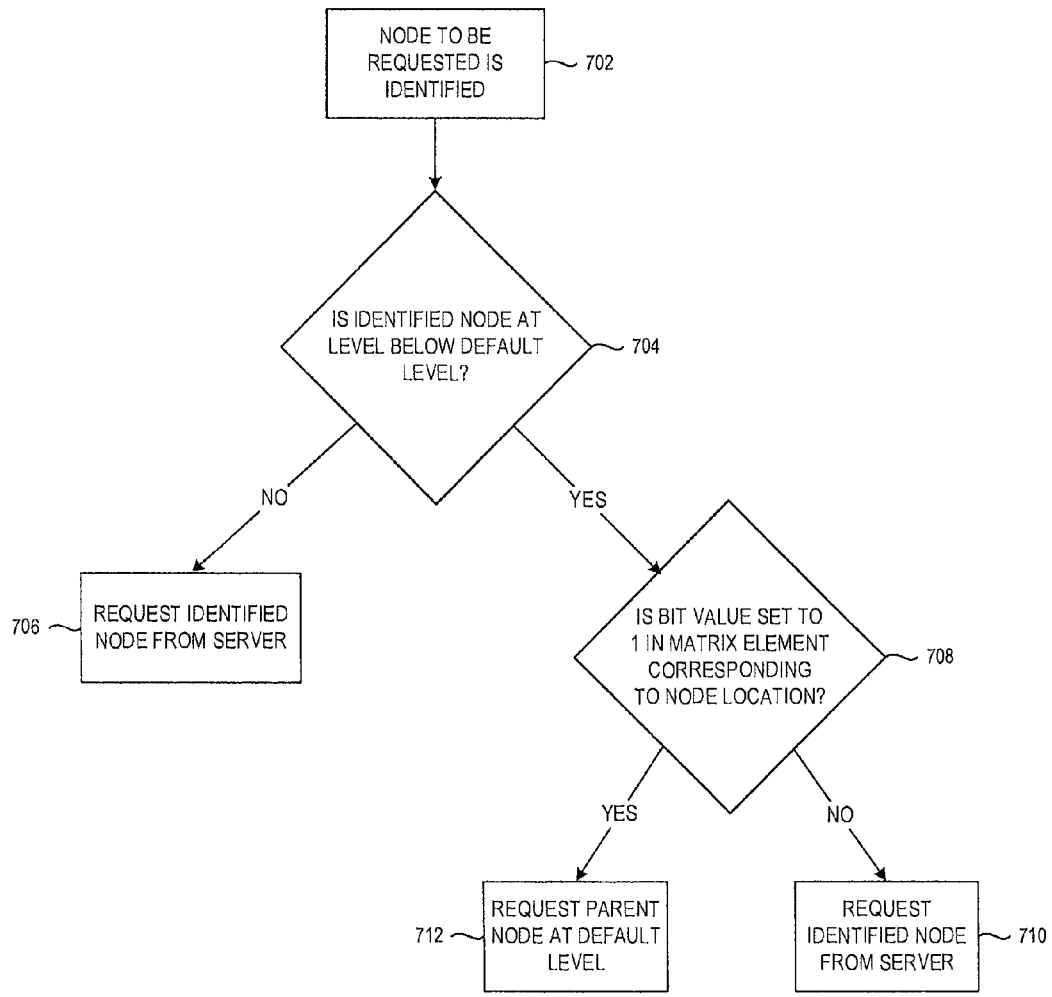
FIG. 7 illustrates an example flowchart related to a method for requesting a node based on the logical value of an element of a matrix.

FIG. 7 shows an example embodiment to use a matrix to map to whether a desired node is optimized. A node to be requested can be identified 702. It is determined whether the requested node is at a level below a default level 704. If the requested node is not below a default level, then the node can be requested from the server 706. (And, it is understood that a check may be performed to determine if the requested node is in local cache.) If, however, the requested node is at a level below a default level, then it is determined whether a bit value of 1 is associated with the element that the matrix maps to. If the answer is no—i.e., if the bit value is 0—then the node will be requested from the server 710. But if the answer is yes—i.e., if the bit value is 1—then it is evident that the nodes, if requested, would turn out to be redundant. Accordingly, the parent node of that requested node at the default level can be requested 712.

By way of non-limiting example, assume that a requested node is at level 13 and the default node is level 10. Because the requested node at level 13 is below the default level at level 10, the matrix is checked to determine whether a bit value of 1 is set in the element that can map to the requested node's location. If a bit value of 1 is returned, this means that the requested node is an optimized node. In other words, it is potentially redundant to the level-10 parent node. As such, the parent node is requested, and its attributes can be assumed to apply to the level 13 child node. This parent node can be a relocatable node.

Again, the nature of the tree data structure can be leveraged related to processing tiles that may contain redundant information to reduce data usage and increase performance. This is shown in at least two ways. First, it can obviate the need to transmit a redundant tile over the network, and the need for the client and server to process the redundant tile. Second, there are savings during the initial tile generation process, where, if an eligible default-level tile is identified as being potentially redundant, no other nodes in the subtree need to be generated.

In an embodiment a server, in request to a client inquiry, can send an HTTP-404 response to indicate an optimized tile, an operation that is less resource-intensive than sending a redundant tile. And, in another embodiment even fewer resources may be needed because, if a matrix at the client is consulted and it is determined that the requested tile would map to an optimized one, the server is not sent a client inquiry for the requested tile in the first place but instead can be sent a request for a default-level parent tile on the subtree.

In an embodiment, the data structure given is a quad tree. However, one of skill in the art will recognize that systems and methods disclosed herein can be applied to an octree, i.e., a tree where each parent has exactly eight child nodes. In an octree, there will be $8^n$ nodes at a given level n. Thus, if level 10 is selected as a default level, given levels 0-15, there will be $8^{10}$ or 1,073,741,824 nodes. This results in a grid of 32,768 rows by 32,768 columns. Other tree data structures may be used.

Added map tiles, beyond those representing water and those representing Antarctica, can be processed in accord with embodiments. For example, tiles in Greenland may be single-attribute only tiles, or otherwise limited-attribute tiles, which will be comparable to those in Antarctica. The same can be true of portions of Nevada, Siberia, and Canada. Selected tiles for such land areas or comparable ones—i.e., land areas bearing one attribute or limited attributes—can under certain circumstances reflect a lack of meaningful map-able characteristics, and can be suitable for optimization.

While the invention has been described in terms of particular embodiments and illustrative figures, those of ordinary skill in the art will recognize that the invention is not limited to the embodiments or figures described.

Some portions of the detailed description are presented in terms of procedures, steps, logic blocks, processing other symbolic representations of operations on data bits that can be performed on computer memory. Each step may be performed by hardware, software, firmware, or combinations thereof.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A computer-implemented method of rendering mapping information on a client device, based on map tile information stored in a tree data structure, the method comprising:
    rendering a tile on a client display;
    receiving, from a server, an indication of a predetermined default level of the tree data structure;
    determining that a user wishes to zoom in to a smaller geographic area than that represented by the rendered tile;
    requesting child tile information, from the server, associated with a child tile of the rendered tile;
    receiving a message, in response to the requesting child tile information, indicating that the server could not find the child tile information associated with the child tile;
    in response to receiving the message indicating that the server could not find the child tile information, requesting, from the server, parent tile information associated with a parent tile of the child tile, the parent tile located at the predetermined default level of the tree data structure; and
    rendering, on the client display, the parent tile information associated with the parent tile.

2. The computer-implemented method of claim 1, wherein the rendering includes repositioning cartography information included in the parent tile information to apply to a representation of a geographic area associated with the child tile, and wherein a relative positioning of cartography information in the parent tile is maintained when rendered on the client display.

3. The computer-implemented method of claim 1, wherein the receiving the message indicating that the server could not find the requested child tile information comprises receiving an HTTP 404 response code.

4. A computer-implemented method for a client device to render mapping information on a client display, the mapping information derived from map tiles arranged in a tree data structure, the method comprising:
    identifying a predetermined default level of the tree data structure;
    requesting, from a remote device over a network, first map information corresponding to a first tile, the first tile located at least two levels below the predetermined default level of the tree data structure;
    receiving a message, in response to the request, indicating that the remote device lacks the first map information corresponding to the first tile; and
    causing rendering of second map information corresponding to a second tile, the second tile located on the predetermined default level of the tree data structure.

5. The computer-implemented method of claim 4, wherein the second map information is requested from the remote device in response to receiving the message.

6. The computer-implemented method of claim 4, wherein the second map information is retrieved from local memory on the client device in response to receiving the message.

7. The computer-implemented method of claim 4, wherein the predetermined default level of the tree data structure is used to render map information for lower level tiles omitted from data storage accessible by the remote device.

8. The computer-implemented method of claim 4, wherein the remote device lacks the first map information corresponding to the first tile because a redundancy determination had been made, in connection with tile generation, that the first tile would have been redundant with the second tile based on at least one attribute.

9. The computer-implemented method of claim 8, wherein the attribute is associated with a type corresponding to water.

10. The computer-implemented method of claim 8, wherein the attribute is associated with a region corresponding to land lacking map-able characteristics below the predetermined default level of the tree data structure.

11. The computer-implemented method of claim 8, wherein the redundancy determination is performed by:
    identifying a specified tile in the tree data structure;
    identifying a predetermined map attribute associated with the specified tile;
    determining whether the predetermined map attribute corresponds to one of a type or region that includes at least one redundant tile;
    determining, based on a presence of the predetermined map attribute with respect to the specified tile, that the specified tile can be considered an optimized tile; and
    refraining from generating at least one tile in a subtree descending from the optimized tile.

12. The computer-implemented method of claim 4, wherein the client device receives and renders data associated with the second tile.

13. The computer-implemented method of claim 12, wherein the data so rendered includes cartographic data from the second tile, the data formatted for rendering in response to determining that the second map information corresponding to the second tile is being used to render geographic location related to the first tile.

14. The computer-implemented method of claim 4, wherein the receiving the message is from a server indicating that the server could not find information associated with the first tile comprises receiving an HTTP 404 response code.

15. The computer-implemented method of claim 4, further comprising:
   requesting, from the remote device over the network, third map information corresponding to a third tile, the third tile located at least two levels below the predetermined default level of the tree data structure and on a different level than the first tile;
   receiving a second message, in response to the request, indicating that the remote device lacks the third map information corresponding to the third tile; and
   causing rendering of fourth map information corresponding to a fourth tile, the fourth tile located on the predetermined default level of the tree data structure.

16. A computer-implemented method by a client device of rendering mapping information on the client device, based on map tile information stored in a tree data structure, the method comprising:
   receiving a data structure from a remote device over a network, the data structure comprising logical values indicating whether at least one map tile in the tree data structure is optimized;
   identifying, in the data structure, a predetermined default level of the tree data structure;
   identifying a first tile desired to be rendered;
   determining, based on a level of the first tile in the tree data structure, that the first tile is below the predetermined default level;
   determining, based on a first logical value in the data structure corresponding to the first tile being set to a predetermined value, that the first tile is optimized; and
   causing to render, on the client device, mapping information based on information associated with a parent tile of the first tile, the parent tile being located on the predetermined default level at least two levels above the first tile.

17. The computer-implemented method of claim 16, further comprising at least one of:
   requesting from the remote device, based on the determination that the first tile is optimized, information associated with the parent tile, on the predetermined default level, of the first tile; or
   retrieving from local memory, based on the determination that the first tile is optimized, information associated with the parent tile, on the predetermined default level, of the first tile.

18. The computer-implemented method of claim 16, wherein the data structure is represented as a matrix.

19. The computer-implemented method of claim 16, further comprising causing to render, on the client device, mapping information based on information associated with the parent tile of the first tile by repositioning cartographic information associated with the parent tile to apply to a representation of a geographic area associated with the first tile.

20. The computer-implemented method of claim 16, wherein the information associated with the parent tile is an attribute corresponding to water.

21. The computer-implemented method of claim 16, wherein the information associated with the parent tile is an attribute corresponding to land lacking map-able characteristics below the predetermined default level of the tree data structure.

* * * * *